United States Patent
Sado et al.

(10) Patent No.: US 7,239,472 B2
(45) Date of Patent: Jul. 3, 2007

(54) METHOD AND APPARATUS FOR WRITING DATA IN A DISK DRIVE

(75) Inventors: Hideo Sado, Ome (JP); Masahide Yatsu, Akishima (JP); Tomoko Taguchi, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/376,594

(22) Filed: Mar. 16, 2006

(65) Prior Publication Data

US 2006/0209452 A1 Sep. 21, 2006

(30) Foreign Application Priority Data

Mar. 18, 2005 (JP) .............................. 2005-079626

(51) Int. Cl.
*G11B 5/00* (2006.01)
*G11B 20/20* (2006.01)

(52) U.S. Cl. .......................................... 360/76; 360/48

(58) Field of Classification Search .................. 360/76, 360/48, 49, 77.04, 77.08, 77.01, 75, 46, 317, 360/121; 318/561; 324/212; 369/13.02
See application file for complete search history.

(56) References Cited

U.S. PATENT DOCUMENTS

| | | | | |
|---|---|---|---|---|
| 5,369,345 A * | 11/1994 | Phan et al. | ................. | 318/561 |
| 5,453,887 A * | 9/1995 | Negishi et al. | ........... | 360/77.01 |
| 5,526,328 A * | 6/1996 | Oshima et al. | .......... | 369/13.02 |
| 5,892,634 A * | 4/1999 | Ito et al. | .................. | 360/77.08 |
| 5,920,447 A * | 7/1999 | Sakata et al. | ................ | 360/121 |
| 6,052,250 A | 4/2000 | Golowka et al. | | |
| 6,088,186 A * | 7/2000 | Carlson | .................... | 360/77.04 |
| 6,128,166 A * | 10/2000 | Tanaka et al. | .............. | 360/317 |
| 6,157,189 A * | 12/2000 | Stark et al. | ................. | 324/212 |
| 6,198,583 B1 * | 3/2001 | Ohinata et al. | ................ | 360/46 |
| 6,347,017 B1 * | 2/2002 | Carlson | ................... | 360/77.04 |
| 6,590,729 B1 * | 7/2003 | Akagi et al. | .................. | 360/48 |
| 6,765,737 B1 | 7/2004 | Lim et al. | | |
| 7,126,775 B1 * | 10/2006 | Zook | ........................... | 360/49 |
| 2002/0176199 A1 | 11/2002 | Gomez et al. | | |
| 2003/0048561 A1 | 3/2003 | Kadokawa | | |

(Continued)

FOREIGN PATENT DOCUMENTS

EP  1 153 138 A2   3/2005

(Continued)

OTHER PUBLICATIONS

Australian Search Report dated Jan. 17, 2007 for Appln. No. 200601213-2.

*Primary Examiner*—Fred F. Tzeng
(74) *Attorney, Agent, or Firm*—Pillsbury Winthrop Shaw Pittman, LLP (57) ABSTRACT

According to one embodiment, there is to provide a data write method which is applied to a disk drive, for recording data on a disk medium by a head mounted on a rotary type actuator. The method carries out a track pitch conversion processing so that a track pitch of data track is set larger than a track pitch in an intermediate circumferential area based on an azimuth angle of the head in the case where the position of the data track is included in an inner circumferential area or outer circumferential area on the disk medium.

14 Claims, 5 Drawing Sheets

U.S. PATENT DOCUMENTS

2005/0117240 A1  6/2005  Codilian et al.

FOREIGN PATENT DOCUMENTS

| JP | 05/054302 | 3/1993 |
| JP | 06-060573 | 3/1994 |
| JP | 06-111502 | 4/1994 |
| JP | 10-134344 | 5/1998 |
| JP | 2001-084719 | 3/2001 |
| JP | 2002-237142 | 8/2002 |
| WO | WO00/68947 | 11/2000 |

* cited by examiner

FIG. 8C

METHOD AND APPARATUS FOR WRITING DATA IN A DISK DRIVE

CROSS-REFERENCE TO RELATED APPLICATIONS

This application is based upon and claims the benefit of priority from Japanese Patent Application No. 2005-079626, filed Mar. 18, 2005, the entire contents of which are incorporated herein by reference.

BACKGROUND

1. Field

One embodiment of the invention generally relates to a disk drive, and particularly relates to a method for writing data in a disk drive of a perpendicular magnetic recording method.

2. Description of the Related Art

In general, in a disk drive which represents a hard disk drive, a rotary type (rotation type) actuator is used as a mechanism for positioning a head at a targeted position (track of an access object) on a disk medium which is a data recording medium.

In the case where a head mounted on such a rotary type actuator is subjected to positioning control (servo control) in the radial direction on the disk medium by control of a CPU which is a main controller of the drive, a so-called azimuth angle is generated in an inner circumferential area or outer circumferential area of the disk medium.

In a disk drive, the servo control is carried out by reproducing a servo pattern (servo data) recorded on the disk medium by a read head contained in the head. In this case, the azimuth angle becomes larger in, for example, the outer circumferential area on the disk medium, and thus, a detection range (detection sensitivity) by the read head is expanded. Consequently, it is a factor causing the lowering of the preciseness of the head positioning.

In order to solve such a problem, there has been proposed a disk drive in which an interval of servo tracks having a servo pattern recorded therein is made narrower in, for example, an outer circumferential area where an azimuth angle becomes larger (see, for example, Jpn. Pat. Appln. KOKAI Publication No. 6-60573).

Moreover, when an azimuth angle is larger, an effective track width of a data track having user data recorded therein is variable, and thus, there is an influence such that the recording density is lowered and so on. In order to solve the problem, a constitution in which a distance between tracks adjoining in the radial direction on a disk medium is changed has been proposed (see, for example, Jpn. Pat. Appln. KOKAI Publication No. 2002-237142).

As a result of an influence generated by the azimuth angle of the head, a so-called fringe area is generated except for an effective recording area in the data tracks in the case where data is written on the disk medium by a write head. This fringe area is an area where data cannot be normally read out by the read head. Particularly, in a disk drive of a perpendicular magnetic recording method, a single pole type head having the length in the circumferential direction of the track is used as a write head, so that the fringe area is generated in a degree that cannot be neglected due to the azimuth angle.

In the above-described prior-art literatures, the technology capable of solving, particularly, the influence of the fringe area by the azimuth angle has not been proposed.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided a data write method which is applied to a disk drive, the method being capable of suppressing, particularly, the influence of a fringe area by an azimuth angle, resulting improvement of the data recording/reproducing characteristics.

(Constitution of Disk Drive)

Figure 1:
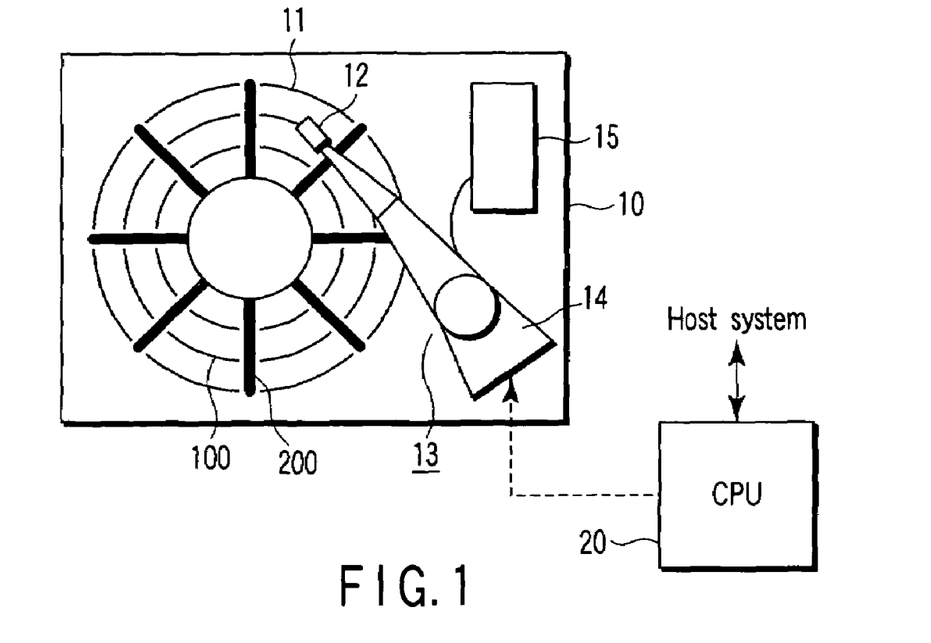
FIG. 1 is a block diagram showing the major portions of a disk drive according to an embodiment of the present invention.

FIG. 1 is a block diagram showing the major portions of a disk drive of a perpendicular magnetic recording method according to the present embodiment.

A disk drive 10 has a disk medium 11 which is rotated by a spindle motor 16, a head 12 for performing data recording or reproduction, and a microprocessor (CPU) 17 which is a main controller.

The head 12 has a structure in which a write head element and a read head element are mounted on a slider. The write head element (120) is a single pole type head capable of performing perpendicular magnetic recording on the disk medium (11). The read head element is a reproduction head which reads out a servo pattern (servo data) or user data recorded on the disk medium 11.

The head 12 is mounted on a rotary type (rotational type) actuator 13. The actuator 13 rotates in the radial direction on the disk medium 11 by a voice coil motor (VCM) 14. The VCM 14 is driven and controlled according to servo control of the CPU 20.

The CPU 20 carries out control for recording or reproducing data to/from a targeted position (access targeted track) on the disk medium 11 in accordance with an instruction sent from a host system such as, for example, a personal computer located outside the drive. In the present embodiment, the CPU 20 carries out servo control (head positioning control) including a track pitch conversion processing described later.

The disk drive 10 is also provided with a circuit board 15 on which circuit parts such as a head amplifier connected to the write head element and the read head element of the head 12, respectively, are mounted.

(Track Format)

In a disk drive, as shown in FIG. 1, a servo pattern (servo data) 200 is recorded on the disk medium 11 during the manufacturing process. An area where the servo pattern 200 has been recorded may be referred to as a servo sector. The servo sectors are arranged at equal intervals in the circumferential direction on the disk medium 11.

The CPU 20 carries out the servo control (head positioning control) by using the servo pattern 200, thereby configuring a data track 100 for recording user data between servo sectors.

Figure 2:
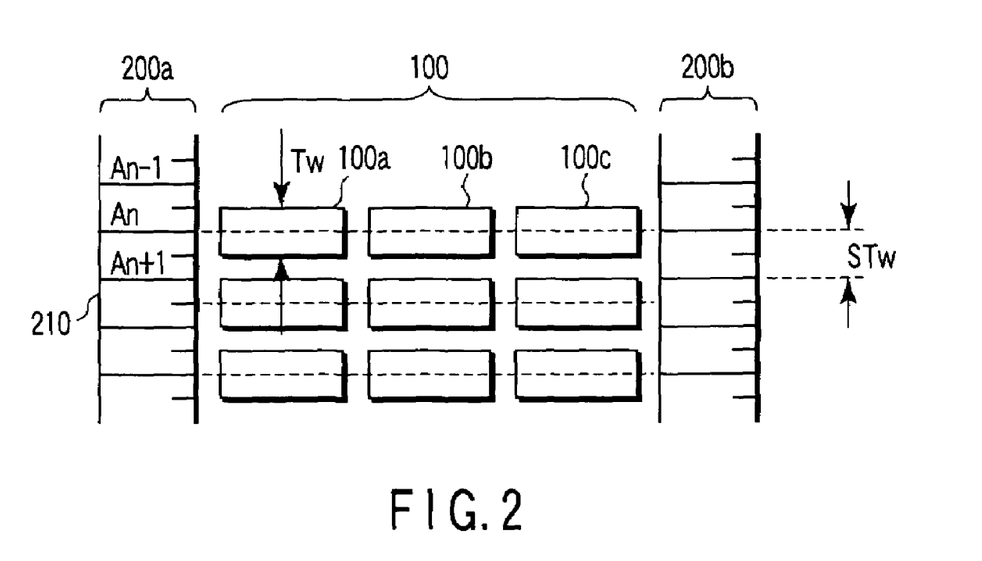
FIG. 2 is a view showing a data format according to the embodiment.

FIG. 2 is a view in which a data surface on the disk medium 11 shown in FIG. 1 has been developed on a flat plane.

As shown in FIG. 2, a large number of data tracks 100 are arranged concentrically in the radial direction 210 on the disk medium 11. The respective data tracks are divided into multiple data sectors 100a to 100c and managed. More specifically, in a disk drive, a data sector is an access unit. In servo sectors 200a, 200b, a track address (cylinder code) An for identifying the data track 100 and servo burst data (A to D) described later have been recorded as data included in the servo pattern.

Here, an interval (STw) of a track (servo track) defined by the servo sectors 200a, 200b and a distance between the adjoining data tracks 100 in the radial direction are not necessarily the same. With respect to the servo track interval, the data tracks 100 are arranged in the radial direction with a distance of 1.5-fold, for example. It should be noted that the distance between the adjoining data tracks 100 in the radial direction means an interval between a central line of a data track width (Tw) (dotted line of FIG. 2) and a central line of the adjoining track.

Figure 3:
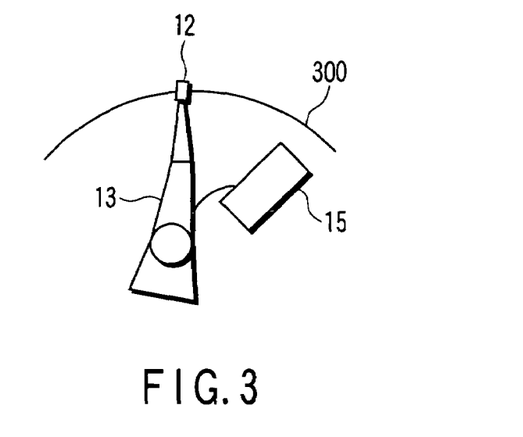
FIG. 3 is a view showing a shape of a servo pattern according to the embodiment.

FIG. 3 shows a shape of the servo pattern 200 radially arranged in the radial direction on the disk medium 11. In a disk drive, as described above, the head 12 moves in the radial direction on the disk medium 11 by the rotary type actuator 13. Thus, it is preferable that the servo pattern 200 indicates a circular arc shape 300 along the rotational trace of the head 12.

(Servo Pattern and Azimuth Angle)

Figure 4A:
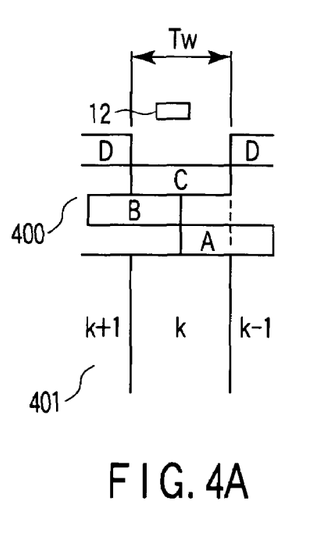
FIGS. 4A to 4C are views for illustrating a servo pattern and an azimuth angle of a head according to the embodiment.
Figure 4B:
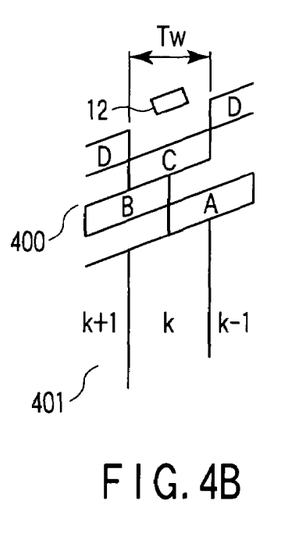
Figure 4C:
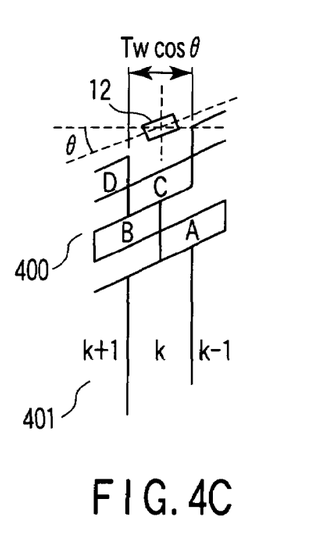

FIGS. 4A to 4C are views for illustrating a servo pattern and an azimuth angle of the head 12 according to the present embodiment.

The servo pattern includes, as shown in FIG. 4A, servo burst data (A to D) 400 and a track address (cylinder code) 401. In this case, the CPU 20 carries out servo control for performing positioning control of the head 12 by controlling the actuator 13 at a targeted data track (for example, track address k) included in the intermediate circumferential area on the disk medium 11. Usually, the CPU 20 positions the head 12 at a center position of a track identified by the track address k by using the servo burst data A, B.

In FIG. 4A, the CPU 20 positions the read head of the head 12 at the targeted data track. Here, in the intermediate circumferential area, the azimuth angle of the head 12 is approximately zero in accordance with the state of the rotary type actuator 13. In contrast to this, as shown in FIG. 4B, the azimuth angle is generated in the head 12 in, for example, the outer circumferential area. In this case, the servo pattern is arranged so that the data tracks are at an equal interval (Tw) in the radial direction of the disk medium 11 not depending on the azimuth angle of the head 12.

With such an arrangement of the servo pattern, in the servo control, the servo pattern in a wide range is detected when the read head has an azimuth angle. In order to solve such a problem, it is preferable that, as shown in FIG. 4C, when the servo pattern is recorded on the disk medium 11, the servo pattern is recorded such that the track interval (cylinder interval) is made narrower in accordance with the azimuth angle ($\theta$) of the head 12 at the track position included in the outer circumferential area or inner circumferential area. For this reason, it becomes possible that the detection sensibility of the servo pattern is maintained at a predetermined level not depending on the azimuth angle when the read head detects the servo pattern in the outer circumferential area and the inner circumferential area. It should be noted that it is practical that the servo patterns are recorded at an interval in accordance with the respective azimuth angles each zone divided in the radial direction on the disk medium 11.

(Azimuth Angle and Data Track Width)

Next, with reference to FIGS. 5A to 5C, the relationship between the azimuth angle of the write head 120 of the head 12 and the data track width will be explained below.

Figure 5A:
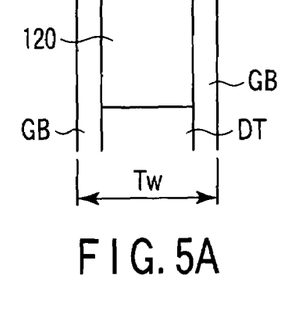
FIGS. 5A to 5C are views for illustrating the relationship between an azimuth angle of a write head and a data track width according to the embodiment.

First, in a disk drive of a perpendicular magnetic recording method, the write head 120 is, as shown in FIG. 5A, a single pole type head whose main magnetic pole has the length in the circumferential direction of the track. It should be noted that the main magnetic pole corresponds to a magnetic gap of the write head for use in a drive of a longitudinal magnetic recording method.

As shown in FIG. 5A, since the azimuth angle is approximately zero in the intermediate circumferential area, user data is written in accordance with a magnetic recording width (W) of the write head 120, and a data track having a recording area DT is configured. Here, the data track width Tw corresponding to the distance between adjoining tracks is determined with a margin such as an erase band width and a positioning error based on the recording area DT. The width corresponding to this margin is called as a guard band area GB.

Figure 5B:
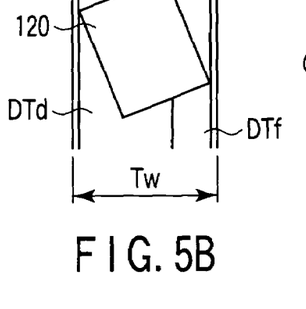
Figure 5C:
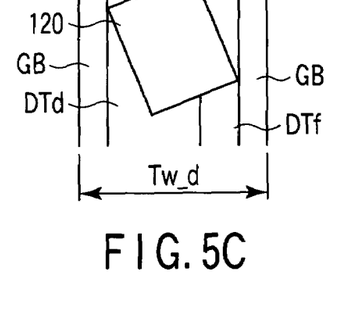

On the other hand, in the outer circumferential area or inner circumferential area, data write is carried out by the write head 120 in a state of the azimuth angle being generated as shown in FIG. 5B. In this case, a fringe area (or side write area) DTf where data reproduction is not stable is generated. In this case, as shown in FIG. 5C, it is preferable that the guard band area GB for sufficiently maintaining the distance between adjoining tracks is secured in accordance with the fringe area DTf.

Here, provided that the magnetic recording width (write head width) is W, the magnetic recording length is L, the guard band width is G, and the azimuth angle of the write head $\theta$, the adjoining distance (track width) Tw of the data tracks in the radial direction can be formulated as indicated in the following formula (1):

$$Tw > W \times \cos\theta + L \times |\sin\theta| + G \qquad (1)$$

It should be noted that the magnetic recording length L may be an equivalent value for indicating the amount of the fringe area DTf. Moreover, in the case where the value of L cannot be neglected from the above-described formula (1), it is necessary to secure the adjoining track distance Tw longer in accordance with $\sin\theta$.

Figure 8A:
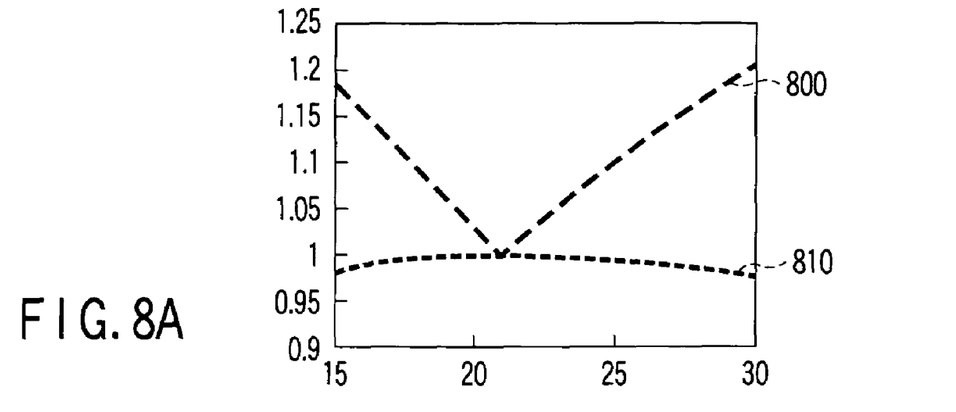
FIGS. 8A to 8C are graphs each showing one example of a set value of the track width with respect to the position of the write head in the radial direction according to the embodiment.
Figure 8B:
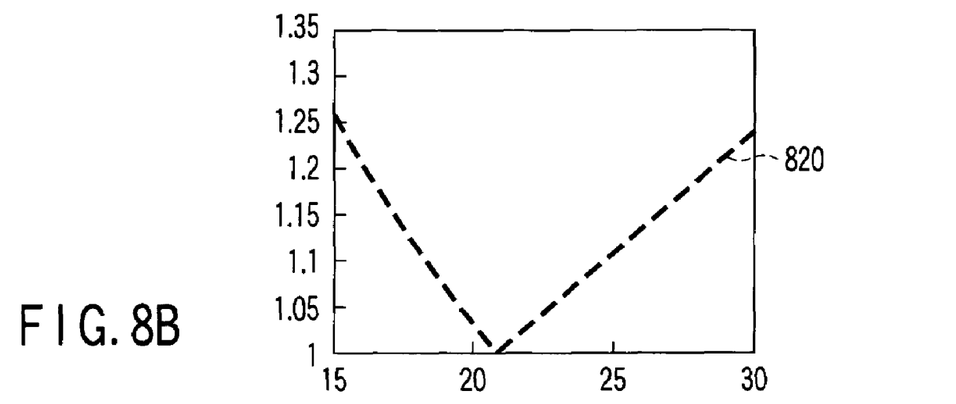
Figure 8C:
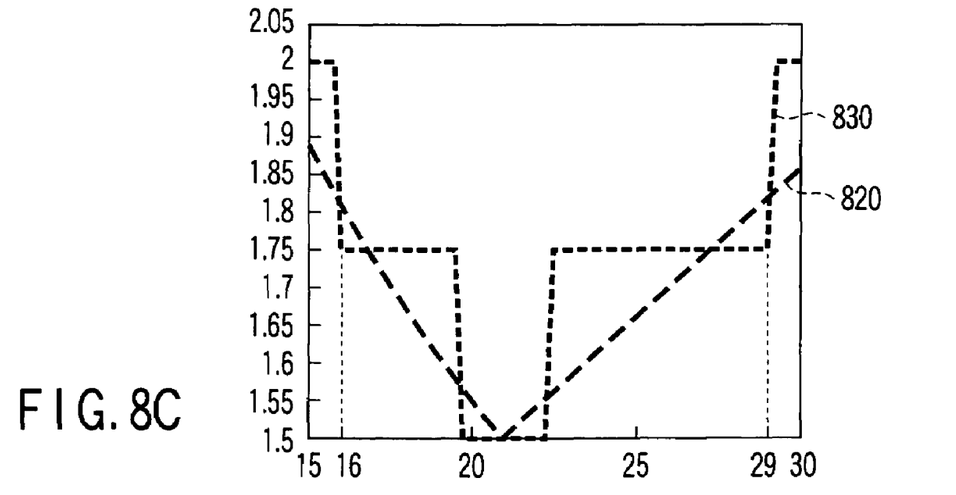

FIGS. 8A to 8C are graphs each showing one example of a track width (cylinder width STw) of a servo pattern with respect to the position of the write head 120 in the radial direction (horizontal axis) on the disk medium 11 and a set value (distance of vertical axis) of a data track width (interval Tw). As shown in FIG. 8A, a track width 810 of the servo pattern is set so as to be narrower at the position of the inner circumferential area or outer circumferential area where an azimuth angle is generated. On the other hand, a data track width 800 is set so as to become wider (distance becomes larger) in the inner circumferential area or outer circumferential area where an azimuth angle is generated.

FIG. 8B shows a ratio of a data track width 820 based on the track width (cylinder width STw) of the servo pattern. More specifically, the servo cylinder interval can be widest, and to the contrary, a user data adjoining distance can be narrowest in the case where there is no azimuth angle of the write head 120 and the fringe area (side write area) can be neglected. Hence, at the ratio of the data track width 820 based on the servo track interval, it is set so as to become the minimum value.

To the contrary, in the case where an azimuth angle is generated in the write head 120, the contrary tendency is indicated, so that, at the ratio based on the servo track interval, it is set so that the data track width 820 becomes larger.

FIG. 8C shows one example of the set value used in a practical case in a processing (track pitch conversion processing) of setting the data track width (data track pitch) when the CPU 20 carries out the write operation as described later.

That is, the ratio based on the servo track interval is set so that it becomes a certain value at a certain interval in the radial direction on the disk medium 11. More specifically, a data track width (interval) 830 which is set per intermediate circumferential area, outer circumferential area and inner circumferential area in the radial direction on the disk medium 11 is utilized as a zone setting value.

(Data Write Operation)

Hereinafter, the data write operation of the present embodiment will be explained below with reference to FIGS. 6 and 7.

Figure 6:
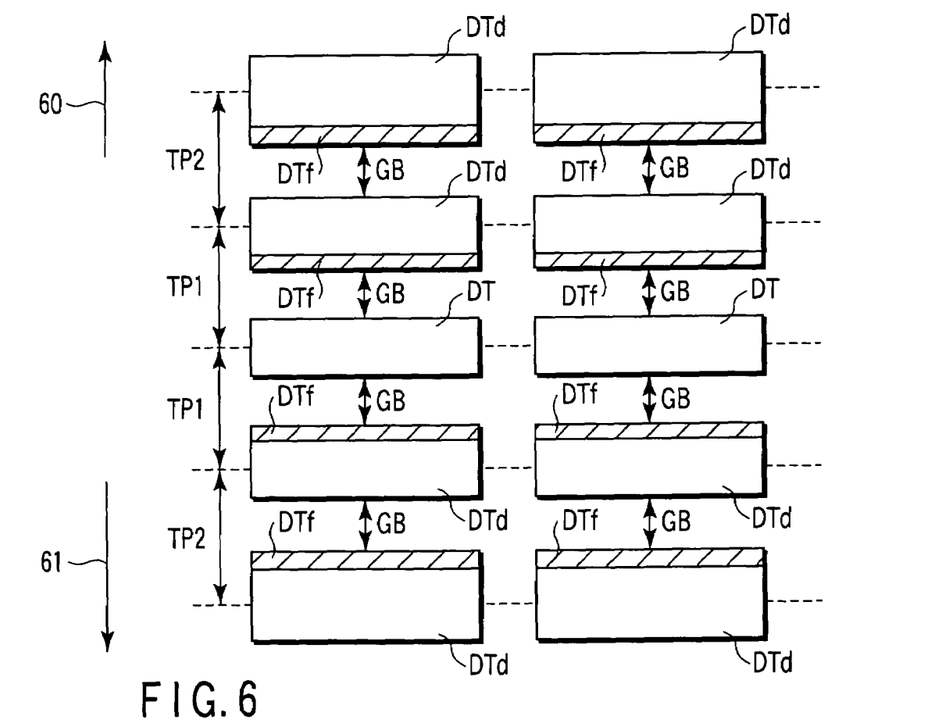
FIG. 6 is a view for illustrating a track pitch of data track in a data write operation according to the embodiment.
Figure 7:
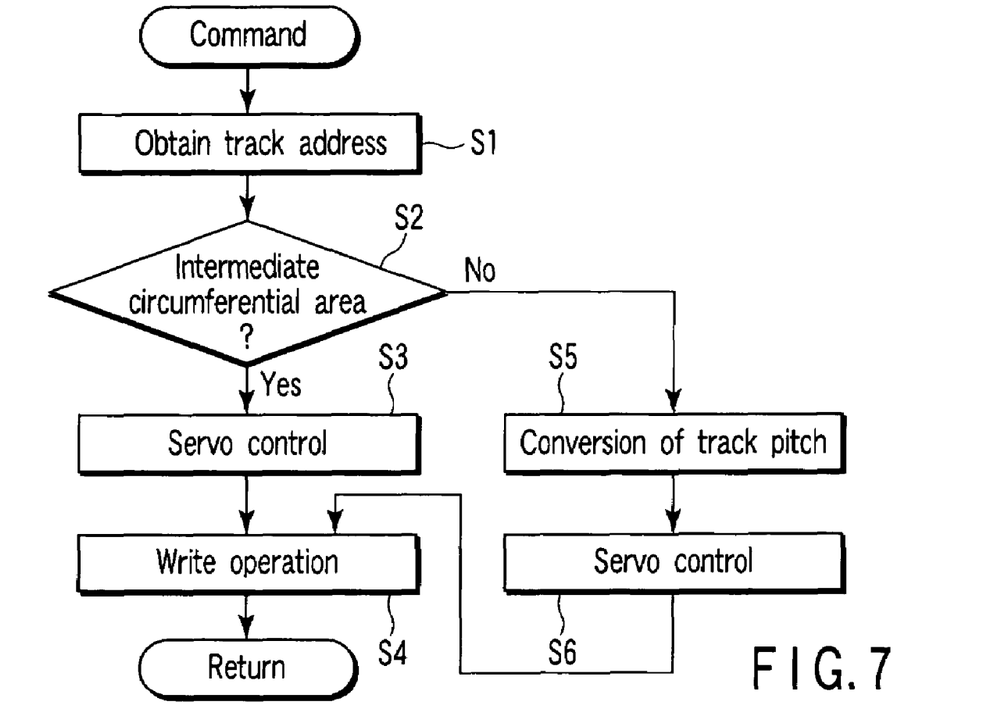
FIG. 7 is a flowchart for illustrating the procedure of the data write operation according to the embodiment.

FIG. 6 is a view for illustrating a state of track pitches of data track in the case where user data is recorded in the radial direction (outer circumferential direction 60 and inner circumferential direction 61) on the disk medium 11 according to the present embodiment.

Herein, track pitches (TP1, TP2) are referred to as an adjoining track interval with the center line (shown by dotted lines) of the data track as a reference. The data track width (Tw) becomes a range including the recording area DTd, the fringe area (side write area) DTf, and the guard band area GB.

When the CPU 20 receives a command of data write sent from the host system, the CPU 20 obtains a track address (cylinder code) indicating a data track position (targeted position) on the disk medium 11 at which the relevant write operation is carried out (block S1). In this case, write data to be recorded on the disk medium 11 is also included in the command sent from the host system.

The CPU 20 determines whether or not a zone including the obtained track address is within the range of the intermediate circumferential area (block S2). Here, each zone includes a plurality of track addresses.

In the case where the targeted data track position which is an access object is included in the intermediate circumferential area on the disk medium 11, the CPU 20 carries out an usual servo control ("Yes" in block S2, S3). That is, the CPU 20 performs the positioning control of the write head 120 of the head 12 at the targeted data track position by driving and controlling the actuator 13 (actually, VCM 14) using the track address and the servo burst data which are reproduced by the read head of the head 12.

Furthermore, the CPU 20 directs the positioned write head 120 to carry out the write operation for writing the data at the targeted data track position (block S4). Here, since the azimuth angle of the write head 120 is approximately zero in the intermediate circumferential area, the data track of only the recording area DTd where no fringe area DTf is reproduced is recorded as shown in FIG. 6 (see FIG. 5A).

In this case, since the azimuth angle of the write head 120 is approximately zero in the intermediate circumferential area, the interval (track pitch) of the adjoining data tracks is determined by the recording area DTd and the guard band area GB without considering the fringe area DTf.

On the other hand, the CPU 20 carries out the track pitch conversion processing in the case where the targeted data track position which is an access object is included in not the intermediate circumferential area, but, for example, the outer circumferential area (arrow 60) on the disk medium 11 ("No" in block S2, S5). Specifically, in the outer circumferential area, the write head 120 carries out the write operation for writing data in a state where the azimuth angle is generated (see FIG. 5C).

The track pitch conversion processing is a processing for setting the track pitches (TP1, TP2) at the time when a predetermined guard band area GB is secured in the data width including the fringe area DTf which is generated when the write operation is performed based on the azimuth angle of the write head 120.

Next, the CPU 20 carries out servo control by using the track address and the servo burst data which are reproduced by the read head of the head 12 (block S6). In this servo control, the CPU 20 performs the positioning control of the center position of the write head 120 in accordance with the track pitch (for example, TP1) calculated by the track pitch conversion processing.

In other words, the CPU 20 carries out the positioning control of the write head 120 so that the track pitch (set by cylinder code) corresponding to the original targeted data track position becomes a track pitch which has been converted based on the azimuth angle of the write head 120. In this case, the conversion amount of the track pitch based on the azimuth angle of the write head 120 is determined by the range of the fringe area DTf in accordance with the relevant azimuth angle, that is, the range of the guard band area GB which is secured in accordance with the increase of the relevant fringe area DTf.

(Concrete Example of Track Pitch Conversion Processing)

The CPU 20 carries out a concrete processing as followings as the track pitch conversion processing.

Namely, the CPU 20 set the ratio of the servo cylinder interval versus data track interval as multiple (integer multiple) of number k as a zone setting value in the case where the address of the targeted data track is converted into the cylinder code of the servo pattern.

More Specifically, in the case where it is set as, for example, "k=¼" in ⅓ feed of the servo pattern, the amount of off-set of the servo pattern as the following can be set. That is, in the case where it is set as "ratio=6/4", the servo pattern position for use in the positioning control of the writhe head 120 becomes "⅛", "1+(⅝)" and "3+(⅛)". In the case where it is set as "ratio=7/4", the servo pattern position for use in the positioning control of the write head 120 becomes "⅛", "1+(⅞)" and "3+(⅝)". In the case where "ratio=8/4", the servo pattern position for use in positioning control of the write head 120 becomes "⅛", "2+(⅛)" and "4+(⅛)".

Figure 9:
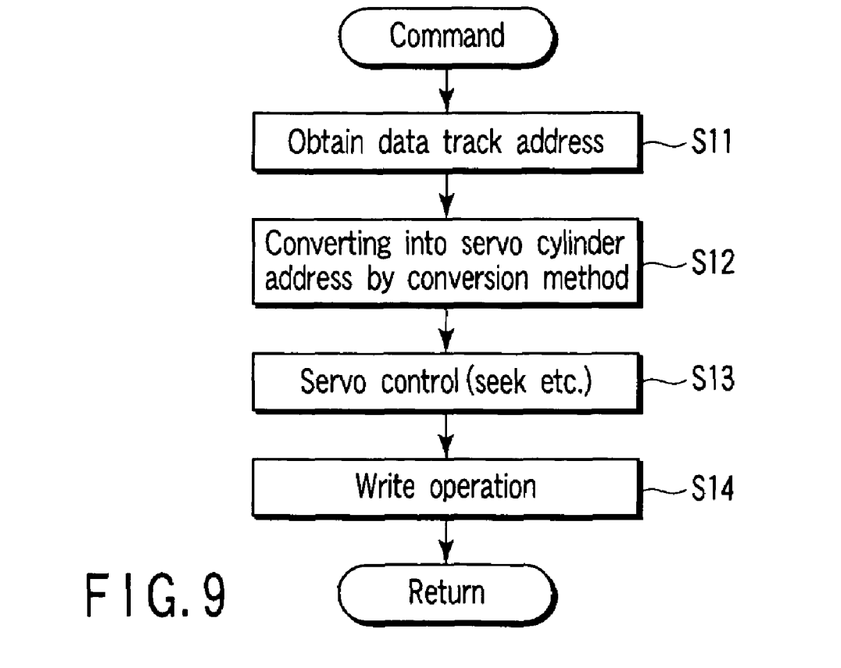
FIG. 9 is a flowchart for illustrating the procedure of a data write operation using a track conversion equation according to the embodiment.

In practice, the CPU 20 carries out the data write operation as shown in a flowchart of FIG. 9 by carrying out the conversion processing using the following track pitch conversion equation (2).

That is, supposing that the targeted data track address is A, the targeted servo cylinder code is B, the pitch conversion coefficient is p, and the correction coefficient is b, the track pitch conversion equation (2) can be represented as the linear equation.

$$B = p \times A + b \quad (2)$$

In the example of "ratio=6/4" described above, the track pitch conversion can be easily achieved by substituting "ratio=6/4" for p, "⅛" for b respectively.

The CPU 20 obtains the data track address for carrying out the write operation in accordance with the command sent from the host system (block S11). Subsequently, the CPU 20 converts the obtained address into a servo cylinder code recorded on the disk medium 11 by using the above-described track pitch conversion equation (2) (block S12). Then, the CPU 20 carries out the servo control for positioning the write head 120 based on the servo cylinder code obtained by conversion (block S13). The positioned write head 120 is caused to carry out the write operation for writing the user data on the disk medium 11.

As described above, according to the present embodiment, setting is made so that the track pitch in the outer circumferential area and the inner circumferential area where the influence by the azimuth angle of the write head 120 is larger than the track pitch in the intermediate circumferential area where there is no influence by the azimuth angle, whereby an error occurred by crosstalk between adjoining data tracks can be mitigated. More specifically, the crosstalk between adjoining data tracks can be suppressed by sufficiently securing the guard band area GB in accordance with the range of the fringe area (side write area) due to the azimuth angle. Therefore, a data track can be configured which can suppress the influence of the fringe area due to the azimuth angle of the head and which is most suitable for recording and reproduction of user data. In other words, the data recording and reproduction characteristics of a disk drive can be enhanced.

A data write method of the present embodiment is particularly effective for a write operation in the case where a single pole type head is used as a write head in a disk drive of a perpendicular magnetic recording method. It should be noted that it is also effective in a disk drive of a longitudinal magnetic recording method.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A data write method which is applied to a disk drive, for recording data on a disk medium by a head mounted on a rotary type actuator, the method comprising:
    deciding a position of a data track to write data on the disk medium in accordance with an instruction sent from a host system;
    determining whether or not the position of the data track is included in an intermediate circumferential area on the disk medium;
    in the case where the position of the data track is included in an inner circumferential area or an outer circumferential area on the disk medium in accordance with the determination results, carrying out a track pitch conversion processing so that a track pitch of the data track is set larger than a track pitch in the intermediate circumferential area based on azimuth angle of the head;
    carrying out servo control for positioning the head at the position of the data track on the disk medium based on the track pitch converted by the track pitch conversion processing or the track pitch in the intermediate circumferential area; and
    carrying out a data write operation by the head positioned by the servo control.

2. The method according to claim 1, wherein
    the decision decides a track address corresponding to the position of the data track from the group of tracks recorded on the disk medium,
    the determination determines whether or not the decided track address is a track address included in the intermediate circumferential area on the disk medium, and
    the servo control carries out the servo control by using the track address.

3. The method according to claim 1, wherein
    the data track includes a data recording area, a fringe area and a guard band area in the radial direction of the disk medium, and
    the track pitch conversion processing sets the track pitch of the data track included in the inner circumferential area or outer circumferential area based on the range of the fringe area that increases in accordance with the azimuth angle of the head.

4. The method according to claim 1, wherein
    the data track includes a data recording area, a fringe area and a guard band area in the radial direction of the disk medium, and
    the track pitch conversion processing sets the track pitch so that the guard band area of the data track included in the inner circumferential area or outer circumferential area is secured at a certain level based on the range of the fringe area that increases in accordance with the azimuth angle of the head.

5. The method according to claim 1, wherein
    the data track includes a data recording area, a fringe area and a guard band area in the radial direction of the disk medium, and
    the track pitch conversion processing sets a track pitch of the data track included in the inner circumferential area or outer circumferential area based on an increasing data track width for securing the guard band area at a certain level.

6. The method according to claim 1, wherein
    at a ratio between a track width of a servo track configured by a servo pattern recorded on the disk medium and a track width of the data track, the track pitch conversion processing sets a track pitch of the data track included in the inner circumferential area or outer circumferential area based on a ratio set with respect to the inner circumferential area or outer circumferential area supposing that the relevant ratio in the intermediate circumferential area is the minimum value.

7. The method according to claim 1, wherein
the disk drive is a drive which records data on the disk medium by a perpendicular magnetic recording method, and
the head is configured to include a single pole type head suitable for the perpendicular magnetic recording method as a write head.

8. The method according to claim 1, wherein
the group of data tracks formed on the disk medium is divided into a plurality of zones in the radial direction, and
the track pitch conversion processing sets the track pitch of the data track each zone included in the inner circumferential area or outer circumferential area.

9. A disk drive comprising:
a rotary type actuator having a head for recording data on a disk medium mounted thereon; and
a controller which carries out write control for writing data on a data track position designated on the disk medium in accordance with an instruction sent from a host system, wherein
the controller includes:
means for deciding the data track position;
means for determining whether or not the data track position is included in an intermediate circumferential area on the disk medium;
conversion means for, in the case where the data track position is included in an inner circumferential area or outer circumferential area on the disk medium, carrying out a track pitch conversion processing so that a track pitch of the data track is set larger than a track pitch in the intermediate circumferential area based on an azimuth angle of the head;
means for carrying out a servo control for positioning the head at the data track position on the disk medium based on a track pitch converted by the conversion means or a track pitch in the intermediate circumferential area; and
means for carrying out a data write operation by the head positioned by the servo control.

10. The disk drive according to claim 9, wherein
the head includes a read head to read data from the disk medium, and a write head to carry out the write operation, which is a single pole type head for perpendicular magnetic recording.

11. The disk drive according to claim 9, wherein
the controller includes:
means for deciding a track address corresponding to a position of the data track from the group of tracks recorded on the disk medium;
means for determining whether or not the decided track address is a track address included in the intermediate circumferential area on the disk medium; and
means for carrying out the servo control by using the track address.

12. The disk drive according to claim 9, wherein
the data track includes a data recording area, a fringe area and a guard band area in the radial direction of the disk medium, and
the controller sets a track pitch of the data track included in the inner circumferential area or outer circumferential area based on the range of the fringe area that increases in accordance with the azimuth angle of the head.

13. The disk drive according to claim 9, wherein
the data track includes a data recording area, a fringe area and a guard band area in the radial direction of the disk medium, and
the controller sets the track pitch so that the guard band area of the data track included in the inner circumferential area or outer circumferential area is secured at a certain level based on the range of the fringe area that increases in accordance with the azimuth angle of the head.

14. The disk drive according to claim 9, wherein
at a ratio between a track width of a serve track configured by a servo pattern recorded on the disk medium and a track width of the data track,
the control sets a track pitch of data track included in the inner circumferential area or outer circumferential area based on a ratio set with respect to the inner circumferential area or outer circumferential area.

* * * * *